United States Patent
Zeng et al.

(10) Patent No.: US 12,460,290 B2
(45) Date of Patent: Nov. 4, 2025

(54) METHOD OF ULTRAFAST-PULSED LASER DEPOSITION COUPLED WITH PLASMA LATTICE AND DEVICE THEREOF

(71) Applicants: Chongqing Huapu Information Technology Co., Ltd., Chongqing (CN); Chongqing Huapu Intelligent Equipment Co., Ltd., Chongqing (CN); Chongqing Huapu Quantum Technology Co., Ltd., Chongqing (CN); Chongqing Huapu Scientific Instrument Co., Ltd., Chongqing (CN); Yunnan Huapu quantum Material Co., Ltd, Yunnan (CN); ROI Optoelectronics Technology CO, LTD., Shanghai (CN); GuangDong ROI Optoelectronics Technology Co., Ltd., Guangdong (CN); Chongqing Institute of East China Normal University, Chongqing (CN); East China Normal University, Shanghai (CN)

(72) Inventors: Heping Zeng, Chongqing (CN); Mengyun Hu, Chongqing (CN); Yu Qiao, Chongqing (CN)

(73) Assignees: CHONGQING HUAPU INFORMATION TECHNOLOGY CO., LTD., Chongqing (CN); CHONGQING HUAPU INTELLIGENT EQUIPMENT CO., LTD., Chongqing (CN); CHONGQING HUAPU QUANTUM TECHNOLOGY CO., LTD., Chongqing (CN); CHONGQING HUAPU SCIENTIFIC INSTRUMENT CO., LTD., Chongqing (CN); YUNNAN HUAPU QUANTUM MATERIAL CO., LTD, Kunming (CN); ROI OPTOELECTRONICS TECHNOLOGY CO, LTD., Shanghai (CN); GUANGDONG ROI OPTOELECTRONICS TECHNOLOGY CO., LTD., Guangdong (CN); CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 18/516,189

(22) Filed: Nov. 21, 2023

(65) Prior Publication Data

US 2024/0183023 A1 Jun. 6, 2024

(30) Foreign Application Priority Data

Nov. 28, 2022 (CN) .......................... 202211505267.7

(51) Int. Cl.
C23C 14/28 (2006.01)
C03C 17/22 (2006.01)
C23C 14/06 (2006.01)

(52) U.S. Cl.
CPC .............. *C23C 14/28* (2013.01); *C03C 17/22* (2013.01); *C23C 14/0635* (2013.01);
(Continued)

(58) Field of Classification Search
CPC ..... C23C 14/28; C23C 14/46; C23C 14/3435; C23C 14/3442; C23C 14/0635;
(Continued)

(56) References Cited

U.S. PATENT DOCUMENTS

| 7,767,272 B2 * | 8/2010 | Liu | ........................ C30B 29/16 |
| | | | 136/252 |
| 2012/0244032 A1 * | 9/2012 | Lappalainen | ........... C23C 14/28 |
| | | | 118/723 R |

* cited by examiner

*Primary Examiner* — Michael P Wieczorek
(74) *Attorney, Agent, or Firm* — Hodgson Russ LLP

(57) ABSTRACT

The present disclosure provides a method of an ultrafast-pulsed laser deposition and a device thereof, wherein a single emitted femtosecond pulse is split, and the split pulses are synchronized in the time domain, and then coupled with each other to form a plasma grating or lattice to excite the target material once; then multiple pulsed lasers are sequentially coupled multiple times with the plasma gratings or lattices to excite the target material multiple times, and the (Continued)

excited target material is deposited and reacted on the substrate to form a thin film.

8 Claims, 5 Drawing Sheets

(52) U.S. Cl.
CPC .... *C23C 14/0652* (2013.01); *C03C 2217/281* (2013.01); *C03C 2217/282* (2013.01); *C03C 2218/151* (2013.01)

(58) Field of Classification Search
CPC .......... C23C 14/0652; C03C 2217/281; C03C 2217/282; C03C 2218/151
See application file for complete search history.

METHOD OF ULTRAFAST-PULSED LASER DEPOSITION COUPLED WITH PLASMA LATTICE AND DEVICE THEREOF

CROSS-REFERENCE TO RELATED APPLICATIONS

The application claims priority to Chinese Patent Application No. 202211505267.7, filed on Nov. 28, 2022, the entire disclosure of which is incorporated herein by reference.

FIELD

The present disclosure relates to the technical field of pulsed laser deposition, specifically to a method of an ultrafast-pulsed laser deposition and a device thereof.

BACKGROUND

In recent years, with the maturity of coating technology, the coating of thin film materials has been widely applied in various fields, such as coating ceramic materials on alloy surfaces to increase the lifespan of the alloy, and coating reflective materials on glass surfaces to achieve an anti-peeping effect, etc. The technology of pulsed laser deposition, as a very practical coating method, has a wide range of applications. The technology of pulsed laser deposition uses pulsed laser to evaporate metal, alloy, oxide, inorganic non-metallic materials and other target materials to form one or more layers of thin films on the surface of an objective materials. Compared with other coating technologies, the technology of pulsed laser deposition has the following advantages: first, the process of it is simple, without complicated operation steps; second, it can be used for vaporing and depositing various different target materials, including metal elements, alloys, oxides, inorganic non-metallic materials, etc.; third, the required temperature is not high so that low-temperature coating can be achieved; fourth, it has high controllability because the film forming effect can be regulated by adjusting the parameters of the pulsed laser; and fifth, the composition is stable and can be used to prepare multicomponent thin films with materials that are homogeneous with the target material.

A laser source in the pulsed laser deposition includes a nanosecond pulsed laser, picosecond pulsed laser, and femtosecond pulsed laser. The advantage of the femtosecond/picosecond pulsed laser over the nanosecond pulsed laser lies in its higher laser power density, where the laser power density of the femtosecond pulsed laser is further higher than that of the picosecond pulsed laser. Moreover, the interaction time between the femtosecond pulsed laser and the material is the shortest, which can vaporize the target material at the moment of interaction without causing athermal impact on the surrounding area of the target material, thereby further improving the quality of the film formation. When the energy of the femtosecond pulsed laser exceeds a certain threshold, it will generate femtosecond filaments when propagates in the medium. Femtosecond filaments are generated based on the balance between Kerr self-focusing effect and plasma-defocusing effect. The femtosecond filaments significantly increase the laser power density of pulsed lasers compared to femtosecond pulsed lasers, but at the same time, the laser power density of the femtosecond filaments is limited by the power clamping effect.

Plasma gratings or lattices to replace femtosecond filaments can effectively solve the problem of power clamping effect. The plasma grating refers to the spatially periodic distribution of plasma channels generated by a cross-coupling of two noncollinear femtosecond filaments with time synchronization. The plasma lattice refers to the spatially periodic distribution of plasma channels generated by a cross-coupling of three noncoplanar femtosecond filaments with time synchronization. The laser power density within the plasma lattice is further increased compared to the plasma grating. When applied to the target material, it can significantly improve the excitation efficiency on the target material and effectively reduce the size of plasma particles in the plasma channel. When the target material is excited, the use of plasma grating or lattice can significantly increase the clamping power compared with the femtosecond filaments, however when using the plasma grating or lattice for deposition, generated plasma is limited due to the short duration of the plasma grating or lattice, resulting in certain limitations to this technology.

SUMMARY

The present disclosure aims to provide a method of an ultrafast-pulsed laser deposition and a device thereof to solve the problem of short duration when using plasma gratings or lattices to excite target materials in prior art.

For the above aim, the present disclosure provides the following technical solution in embodiments.

On the one hand, the present disclosure provides a method of an ultrafast-pulsed laser deposition in embodiments, including:
  step 1: after splitting a femtosecond-pulsed laser beam, focalizing split femtosecond-pulsed laser beams to form a plasma channel based on a nonlinear effect and to generate a femtosecond laser filament; synchronizing the femtosecond-pulsed laser beam by delay synchronization processing so as to form a plasma grating or a plasma lattice by the femtosecond laser filament coupled with each other non-collinearly and crossly; and exciting a target material with the plasma grating or the plasma lattice;
  step 2: emitting multiple ultrafast-pulsed laser beams as post pulses; coupling the post pulses with the plasma grating or the plasma lattice sequentially, by controlling a first delay between the post pulses and the plasma grating or the plasma lattice and a second delay between the post pulses thereof, so as to form a regenerated plasma grating or a regenerated plasma lattice with multi-stage cascade in a time domain; and exciting the target material for multiple times; and
  step 3: exciting and ablating the target material by adjusting the ultrafast-pulsed laser beams coupled with the regenerated plasma grating or the regenerated plasma lattice, to form a thin film with a required thickness by a deposition of ablated particles on a substrate, by controlling the time.

On the other hand, the present disclosure further provides a device for an ultrafast-pulsed laser deposition, including a laser generation module, a delay synchronization module, a focusing module, a deposition chamber, and a carrier module, wherein a beam splitter is arranged between the laser generation module and the delay synchronization module, the focusing module is arranged between the delay synchronization module and the deposition chamber, the carrier module is arranged in the deposition chamber, and the carrier module includes a target material platform and a substrate platform.

The principle and advantages of the solutions above are that: in related technologies, the duration of the plasma lattice induced by a femtosecond laser is short, leading to a short duration for excitation in practical applications thereby restricting application scenarios. Based on this, the technical solution of the present disclosure utilizes multiple post pulses to couple with a plasma grating or lattice, thus injecting energy into the plasma grating or lattice and extending the duration of the plasma lattice, thereby solving the problem of the short duration of plasma gratings or lattices, and the plasma grating or lattice can be further modulated through post pulses.

The beneficial effects of the technical solution are as follows.

i. In the present technical solution, with respect to a target material exciting, the target material is excited by the plasma grating or lattice with an extremely short pulse width firstly, which has a higher laser power density compared to the picosecond/femtosecond pulsed laser and the femtosecond filament, and can effectively break through the power clamping effect of the femtosecond filament, thus increasing the laser power density within the plasma grating or lattice to above 1014 W/cm2, thereby exciting the target material more effectively.

ii. In the present technical solution, the high temperature plasma excited by the plasma grating or lattice can help molten materials to transfer to the substrate more quickly and effectively for cooling and film forming. Moreover, when the plasma grating excites the target material, the heat affected zone during the processing is small, which is conducive to improving the flatness of the film formed. In addition, the processing precision by using the plasma grating or lattice is high, and thus can realize the processing of fine and complex structures.

iii. The present technical solution couples the post pulse with the plasma grating or lattice to excite the target material, overcoming the power clamping effect of the femtosecond filament, and the energy in the plasma grating or lattice after coupled with the post pulse is further increased and is far higher than that of the picosecond/femtosecond pulsed laser, thereby can effectively excite super hard materials, ultra-stable oxides, ceramics, and other materials that are difficult to be excited by traditional pulsed lasers.

iv. The present technical solution couples the post pulses with the plasma grating or lattice with an appropriate pulse delay, such that the plasma grating or lattice coupled with the post pulses has a long and stable plasma channel, which reduces the reverse effects on excitation efficiency caused by uneven target material surfaces during the processing, thereby increasing the uniformity of the coating.

v. The present technical solution utilizes multiple post pulses to couple with the plasma grating or lattice one after another, and excites the plasma within the plasma grating or plasma lattice multiple times, thus greatly extending the duration of the plasma grating or lattice, thereby effectively solving the problem of short duration of a single plasma grating exciting a sample.

vi. According to the present technical solution, the delay between the post pulse and the plasma grating or lattice can be adjusted based on the specific target material, to achieve the optimal coupling excitation effect.

vii. The present technical solution utilizes the plasma grating or lattice for ablation of target material, where in the plasma grating or lattice channel, clusters, atoms, molecules or ions generated by the ablation of target material are excited to a excited state of a high-energy state by multi photons of the laser and the collision of electrons and ions. The particles in the excited state have better reactivity, which is conducive to the reaction when depositing films. The coupling of multiple pulses into the plasma channel forms a highly ionized state and enhances the plasma density, which is conducive to the formation of stable compound films during the deposition on the substrate.

In some embodiments, in the step 1, each of the split femtosecond-pulsed laser beams possesses energy greater than 0.5 mJ, a repetition frequency of 1 Hz-1 MHz, a center wavelength of 200-2,500 nm, and a pulse width of 5-1,000 fs.

In embodiments of the present disclosure, the energy of the femtosecond laser has a significant impact on excitation efficiency and effect. The single pulse energy of a femtosecond laser must be high enough to form a plasma grating or lattice, and to reflect the superiority of the plasma grating or lattice, for the coating effect is not apparently under low energy conditions. The repetition frequency is related to the efficiency of coating in a large area. The higher the repetition frequency, the more pulses per unit time, such that a faster scanning coating can be achieved with an increase of the sample movement speed. The pulse width of the femtosecond is also related to the formation of plasma gratings or lattices. Generally, the formation of plasma gratings or lattices is based on the laser power density, that is, the laser energy divided by the pulse width and then divided by the spot area. The larger this value, the more helpful to form plasma gratings or lattices. Accordingly, pulses with long pulse width require higher laser energy to form plasma gratings or lattices, but its corresponding coating effect is also difficult to achieve in the case of using short pulses. The central wavelength of a laser is related to the energy of photons. The shorter the wavelength, the greater the energy of photons, and the stronger the ability to ionize and excite the target material. In embodiments of the present disclosure, the single pulse energy of the femtosecond laser output after the splitting is greater than 0.5 mJ to ensure the formation of femtosecond filaments. The plasma formed by femtosecond pre-pulsed excitation of the target material can assist in the formation of a plasma grating or lattice with multiple post pulses to achieve a secondary excitation. The secondary excitation by the plasma grating or lattice can effectively help to reduce the clusters in the plasma generated in the pre-pulsed excitation, thereby improving the uniformity of the coating.

In some embodiments, in the step 1, the split femtosecond-pulsed laser beams possess an angle of 5 to 21° therebetween.

In embodiments of the present disclosure, an incidence at Bragg angle for the coupling can ensure maximum energy after the coupling. An excessive angle will lead to poor coupling effect and even result in failing to form plasma gratings or lattices. The angle between the split femtosecond-pulsed lasers in embodiments is relatively small. Therefore, when multiple femtosecond-pulsed lasers cross at the small angle after being focused, they will interact in the crossed area, resulting in interference and forming a periodic intensity distribution. In the region where the light intensity is longer, in view of the Kerr effect, the light intensity further increases, and the plasma grating or lattice is firstly generated here and reaches equilibrium with the Kerr effect, forming spatially periodic distributed plasma channels.

In some embodiments, in the step 2, the ultrafast-pulsed laser beam is at least one of the femtosecond-pulsed laser, a picosecond-pulsed laser and a nanosecond-pulsed laser.

In embodiments of the present disclosure, the ultrafast-pulsed lasers may be the femtosecond-pulsed lasers, picosecond-pulsed lasers, or even nanosecond-pulsed lasers, all of which can meet processing requirements.

In some embodiments, in the step 2, the first delay between the post pulses and the plasma grating or the plasma lattice is 10 ps to 1 ns.

In embodiments of the present disclosure, the (first) delay between the post pulses and the plasma grating or lattice has a crucial impact on the coupling effect. Generally, the delay between the post pulses and the plasma grating or lattice is shorter than the duration of the plasma grating or lattice. After coupled with the post pulses, the plasma grating or lattice has duration for excitation in the order of hundreds of picoseconds. In addition, a certain delay (i.e. the second delay) between the post pulses may be further introduced. Through practical verification, a first delay of ps to 1 ns has the best effect on extending the duration for excitation of the plasma gratings or lattices.

In some embodiments, in the step 2, an incident angle between the post pulse and the plasma grating or the plasma lattice is 7 to 21°.

In embodiments of the present disclosure, coupling the post pulses in a first-order or higher-order Bragg diffraction angle with the plasma grating or lattice maximizes the coupling effect, increases the plasma density within the plasma grating or lattice, and effectively reduces the particle size of the plasma within the plasma grating or lattice, and is conducive to depositing a dense and flat film layer. An excessive angle leads to excessive low energy of the post pulses to couple with the plasma lattice, resulting in losing the coupling enhancement and failing to prolong the duration of the plasma lattice. In practical applications, the post pulses may be incident at any point on the plasma grating or lattice surface.

In some embodiments, in the step 3, the deposition is performed in a deposition chamber set with a rare gas environment, in which the rare gas is at least one of helium and argon.

In embodiments of the present disclosure, utilizing rare gases (such as helium and argon) as buffer gases during operation not only prevents the excited target material from reacting with the components in the gas to affect the film quality, but also helps to enhance the laser power density and plasma density within the plasma grating or lattice, thereby improving the excitation efficiency of the target material.

In some embodiments, in the step 1, two or three split femtosecond-pulsed laser beams are formed, when crossly coupled, two femtosecond laser filaments are non-collinearly and crossly coupled to form the plasma grating, and three femtosecond laser filaments are noncoplanarly and crossly coupled to form the plasma lattice.

In embodiments of the present disclosure, there are slight differences in coupling results based on different splitting. Two femtosecond filaments are non-collinearly and crossly coupled to form a plasma grating, while three femtosecond filaments are non-coplanarly and crossly coupled to form a plasma lattice. Both the plasma grating and the plasma lattice can meet the excitation requirements.

In some embodiments, a laser generation module includes a laser unit and a shutter.

In embodiments of the present disclosure, the laser unit is used to emit laser, and the shutter is for controlling the laser unit, making it easy to operate.

DETAILED DESCRIPTION

Figure 1:
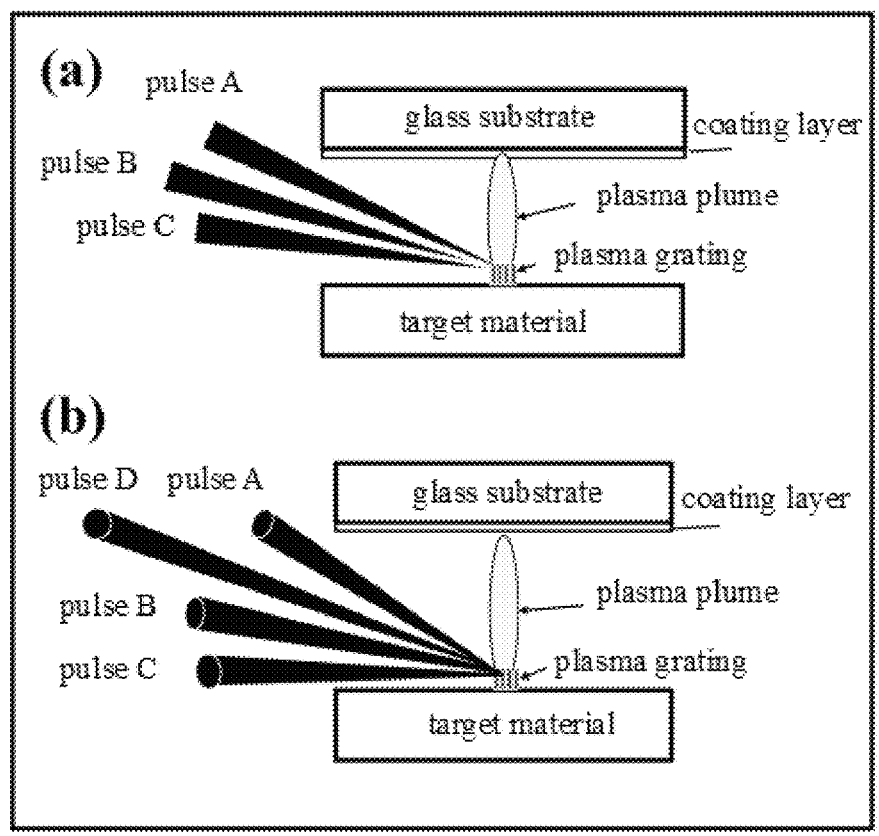
FIG. 1 shows a schematic diagram of a method of an ultrafast-pulsed laser deposition coupled with a plasma grating and with a plasma lattice.

Reference will be made in detail to embodiments of the present disclosure, but the embodiments of the present disclosure are not limited to these. If not particularly specified, the technical means used in the following embodiments are well-known conventional means for those skilled in the art; the experimental methods used are all conventional methods; the materials, reagents, etc. used can be commercially available; and the content mentioned in the embodiments is not a limitation of the present disclosure.

References in the drawings are as follows.

Figure 9:
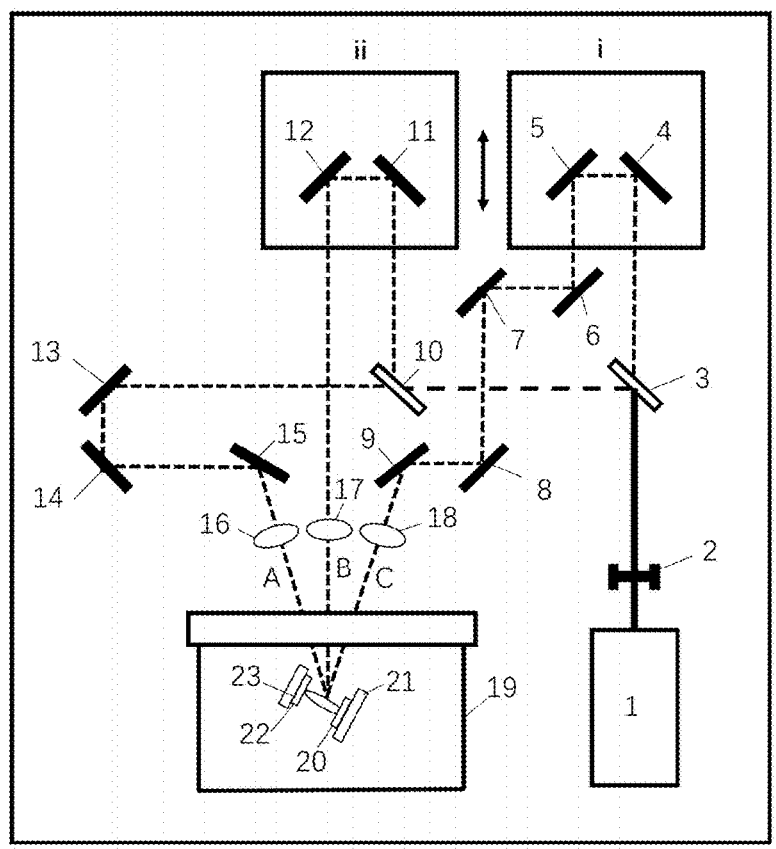
FIG. 9 shows a schematic diagram of a coating device through deposition with an ultrafast-pulsed laser coupled with a plasma grating.

In FIG. 9, 1 represents a femtosecond laser unit; 2 represents a shutter; 4, 5, 6, 7, 8, 9, 11, 12, 13, 14 and 15 are reflectors; 3 and 10 are beam splitters; i and ii are stepper motors; 16, 17 and 18 are lenses; 19 is a deposition chamber; 20 is target material; 21 is a target material platform; 22 is a substrate; and 23 is a substrate platform.

Figure 10:
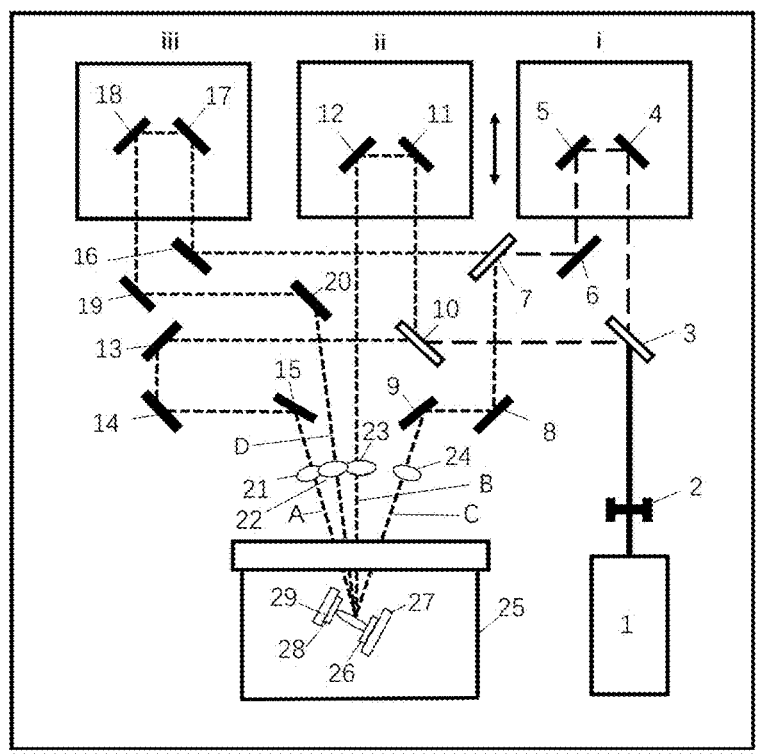
FIG. 10 shows a schematic diagram of a coating device through deposition with an ultrafast-pulsed laser coupled with a plasma lattice.

In FIG. 10, 1 represents a femtosecond laser unit; 2 represents a shutter; 4, 5, 6, 8, 9, 11, 12, 13, 14, 15, 16, 17, 18, 19 and 20 are reflectors; 3, 7 and 10 are beam splitters; i, ii and iii are stepper motors; 21, 22, 23 and 24 are lenses; 25 is a deposition chamber; 26 is target material; 27 is a target material platform; 28 is a substrate; and 29 is a substrate platform.

The present disclosure provides a method of an ultrafast-pulsed laser deposition in embodiments, including:
step 1: splitting a femtosecond-pulsed laser beam into two or three femtosecond-pulsed laser beams, and focalizing split femtosecond-pulsed laser beams with a lens to form a plasma channel based on a nonlinear effect and to generate a femtosecond laser filament; synchronizing the femtosecond-pulsed laser beam through a delay synchronization module thereby realizing noncollinear interaction between the split femtosecond laser filaments, in which two femtosecond laser filaments are non-collinearly and crossly coupled to form a plasma grating, and three femtosecond laser filaments are non-coplanarly and crossly coupled to form a two-dimensional plasma lattice; and exciting a target material with the plasma grating or the plasma lattice firstly;

step 2: emitting multiple ultrafast-pulsed laser beams as post (after) pulses; coupling the post pulses with the plasma grating or the plasma lattice sequentially, by controlling a first delay between the post pulses and the plasma grating or the plasma lattice and a second delay between the post pulses thereof, so as to form a regenerated plasma grating or a regenerated plasma lattice with multi-stage cascade in a time domain; and exciting the target material for multiple times; and step 3: exciting and ablating the target material by adjusting the regenerated plasma grating or the regenerated plasma lattice coupled with the ultrafast-pulsed laser beams, to form a thin film with a required thickness by a deposition of ablated particles on a substrate, by controlling the time.

As shown in FIG. 1(a) which is a schematic diagram of the method of an ultrafast-pulsed laser deposition coupled with a plasma grating, during the processing, the target material and a glass substrate are parallelly placed on three-dimensionally adjustable platforms individually, with a distance of 1-5 mm between the target material and the glass substrate. Firstly, by adjusting knobs on a stepper motor to change positions of the two lenses on the stepper motor, thus changing optical paths of the corresponding pulses, so that pulse A and pulse C are synchronized and focused by the lens thereby forming the femtosecond filaments, which are crossly coupled to form a plasma grating. The target material is excited by the plasma grating, forming a plasma plume containing ions and electrons of the target material, and the plasma plume is sprayed along the normal direction of the target material. After a certain interval (i.e. delay), a post pulse B, with the incidence on the surface of the plasma grating at a first-order or higher-order Bragg diffraction angle, couples with the plasma grating to perform a secondary excitation to the target material. The sprayed plasma plume is cooled and forms a film layer on the substrate. After one excitation round, the target material and glass substrate are moved for the next round of excitation and deposition, ultimately forming the film layer in a large area.

As shown in FIG. 1(b) which is a schematic diagram of the method of an ultrafast-pulsed laser deposition coupled with a plasma lattice, during the processing, the target material and a glass substrate are parallelly placed on three-dimensional adjustable platforms individually, with a distance of 1-5 mm between the target material and the glass substrate. Firstly, by adjusting a stepper motor, pulse A, pulse B and pulse C are synchronized (the method is as described above) and focused by the lens thereby forming the femtosecond filaments, which are crossly coupled to form a plasma lattice. The target material is excited by the plasma lattice, forming a plasma plume containing ions and electrons of the target material, and the plasma plume is sprayed along the normal direction of the target material. After a certain interval (i.e. delay), a post pulse D, with the incidence on the surface of the plasma lattice at a first-order or higher-order Bragg diffraction angle, couples with the plasma lattice to perform a secondary excitation to the target material. The sprayed plasma plume is cooled and forms a film layer on the substrate. After one excitation round, the target material and glass substrate are moved for the next round of excitation and deposition, ultimately forming the film layer in a large area.

Figure 2:
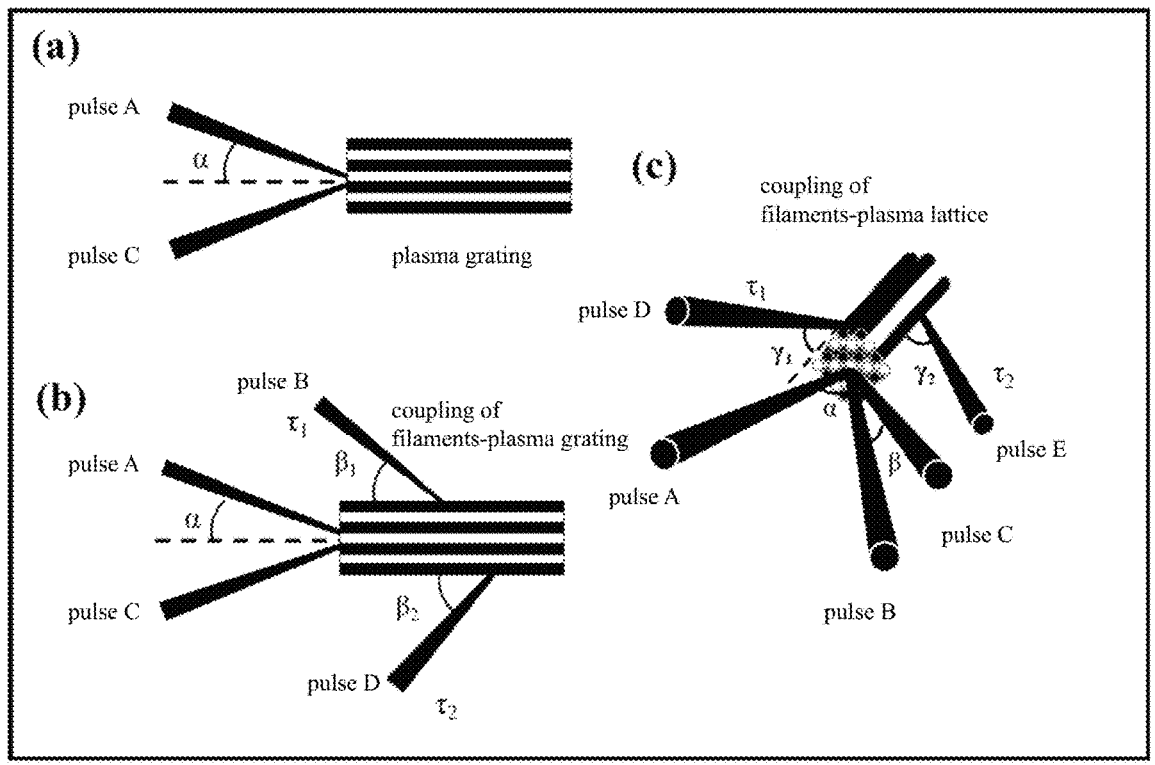
FIG. 2 shows a schematic diagram of the coupling with a plasma grating and with a plasma lattice.

FIG. 2(a) is a schematic diagram of the femtosecond filament coupled to form a plasma grating. FIG. 2(b) is a schematic diagram of the coupling between the post pulse and the plasma grating. FIG. 2(c) shows a schematic diagram of the coupling between the post pulse and the plasma lattice.

The steps of the coupling between the post pulse and the plasma grating are as follows. Opposite pulse A and pulse C are focused through two lenses to form femtosecond filaments, which are crossly coupled on the surface of the target material to form a plasma grating to excite the target material. The angle between pulse A and pulse C is $2\alpha$. Subsequently, pulse B and pulse D, with incidences after intervals (i.e. delays) of $\tau 1$ and $\tau 2$ respectively, are coupled with the plasma grating. Pulse B and pulse D may act on both sides or the same side of the plasma grating, and the angles between pulse B and pulse D relative to the plasma grating are $\beta 1$ and $\beta 2$ respectively, where $\beta 1$ and $\beta 2$ are the first-order or higher-order Bragg diffraction angles, and the Bragg angle satisfies $2\Lambda \sin \beta = n \times \lambda$, in which $\beta$ is the incident angle of the post pulse relative to the plasma grating, $\Lambda$ is the period of the plasma grating, $\lambda$ is the central wavelength of the pulsed laser, and n is the order. The coupling effect is achieved by the cross interaction between pulse B and pulse D with femtosecond plasma gratings. The addition of the coupling with the post pulse can increase the laser power density and plasma density within the plasma grating, as well as significantly increase the length of the plasma channel. Due to the close correlation between the coupling effect of the post pulse and the incident angle of the post pulse relative to the plasma grating, the incident angle needs to be optimized according to the actual situation to achieve a better coupling excitation effect to assist in the coating. It should be noted that when the incident angle is greater than 21°, the coupling enhancement effect weakens. Adjusting the incident angle can make the coupled plasma grating the strongest.

Figure 3:
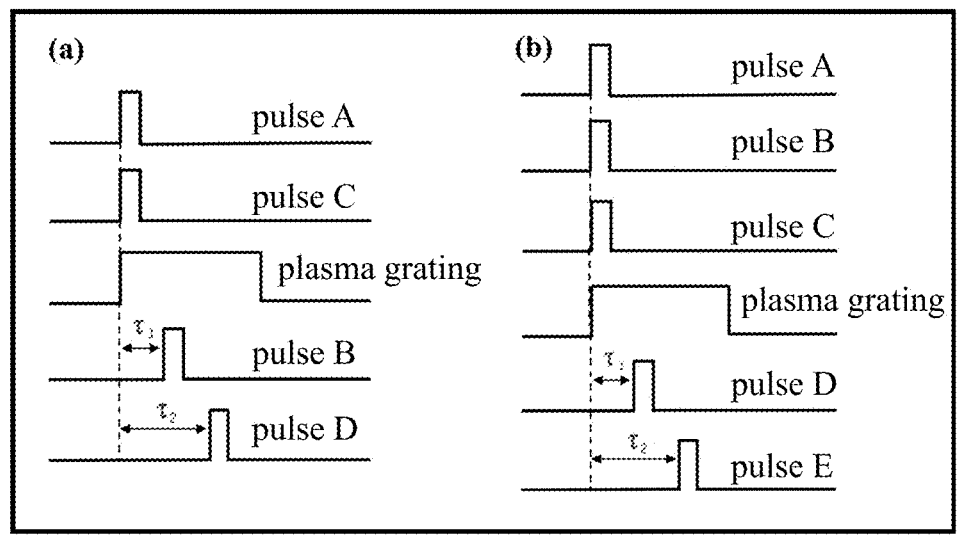
FIG. 3 shows a pulse timing of a coupling between post pulses and a plasma grating/lattice.

The steps of the coupling between the post pulse and the plasma lattice are as follows. Pulse A, pulse B and pulse C are focused through three lenses to form filaments, which are crossly coupled on the surface of the target material to form a plasma lattice to excite the target material. The angle between pulse A and pulse C is $\alpha$, and the angle between pulse B and pulse C is $\beta$. Subsequently, pulse D and pulse E respectively with incidences after certain delays are coupled with the plasma lattice, and the delays of pulse D and pulse E relative to the plasma lattice are $\tau 1$ and $\tau 2$. In addition, the angles and incident positions of pulse D and pulse E relative to the plasma lattice may be different, for example, pulse D and pulse E may act on both sides or on the same side of the plasma lattice, and the angles between pulse D and pulse E relative to the plasma lattice are $\gamma 1$ and $\gamma 2$ respectively, where $\gamma 1$ and $\gamma 2$ are the first-order or higher-order Bragg diffraction angles, and the Bragg angle satisfies $2\Lambda \sin \gamma = n \times \lambda$, in which $\gamma$ is the incident angle of the post pulse relative to the plasma lattice, $\Lambda$ is the period of the plasma lattice, $\lambda$ is the central wavelength of the pulsed laser, and n is the order. The coupling effect is achieved by the cross interaction between pulse D and pulse E with the femtosecond plasma lattice. FIG. 3(a) shows a pulse timing of the coupling between post pulses and a plasma grating, and FIG. 3(b) shows a pulse timing of the coupling between post pulses and a plasma lattice.

Figure 4:
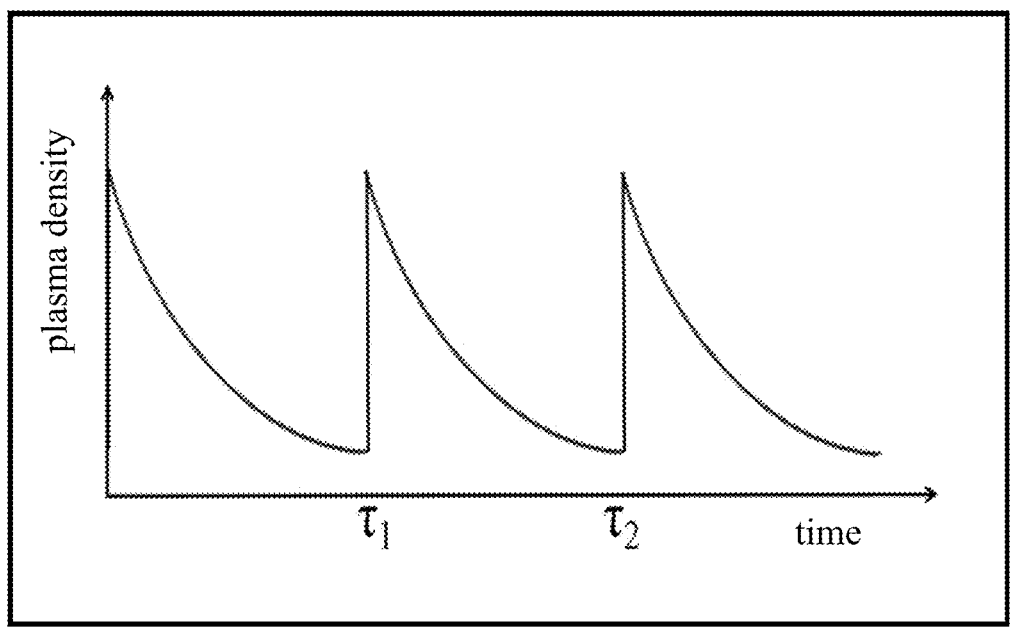
FIG. 4 shows a variation of the plasma density over time within a plasma grating/plasma lattice coupled with post pulses.

When multiple post pulses with delays therebetween are coupled with a plasma grating or lattice, the variation of the plasma density within the plasma grating or lattice over time is shown in FIG. 4. Every time after post pulses incident, the plasma density can be effectively rebounded, thus helping to excite the target material. Therefore, coupling multiple post pulses with plasma gratings or lattices can continuously increase the number of plasmas in the plasma gratings or lattices, making plasma gratings or lattices with shorter durations arrive at an equivalent effect to long pulse width excitation, thereby improving the excitation efficiency to the target material.

Figure 5:
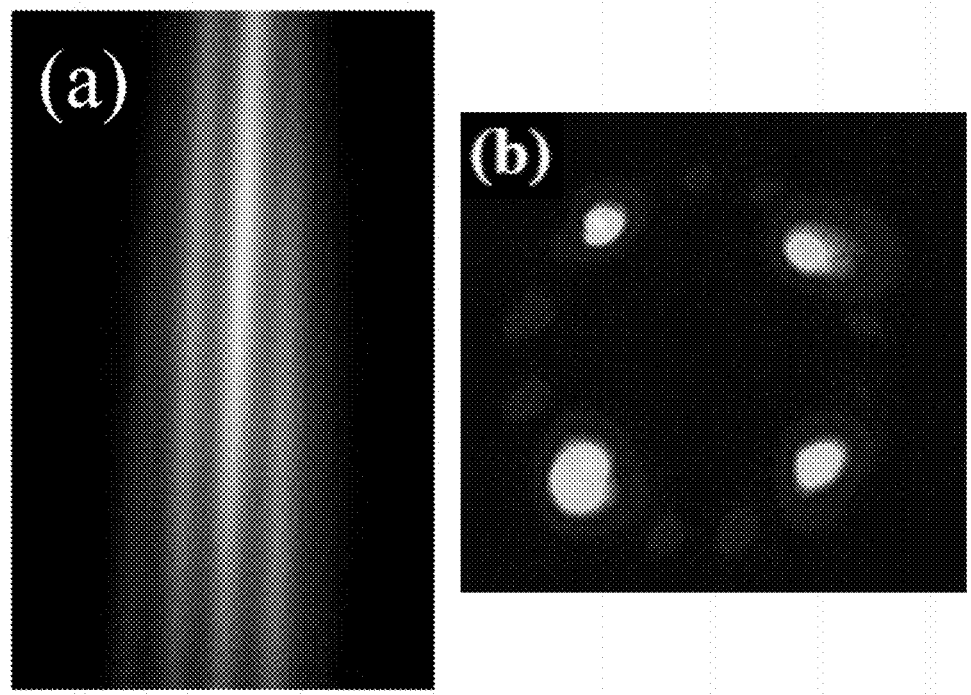
FIG. 5 shows images of plasma gratings and plasma lattices captured through ICCD.
Figure 6:
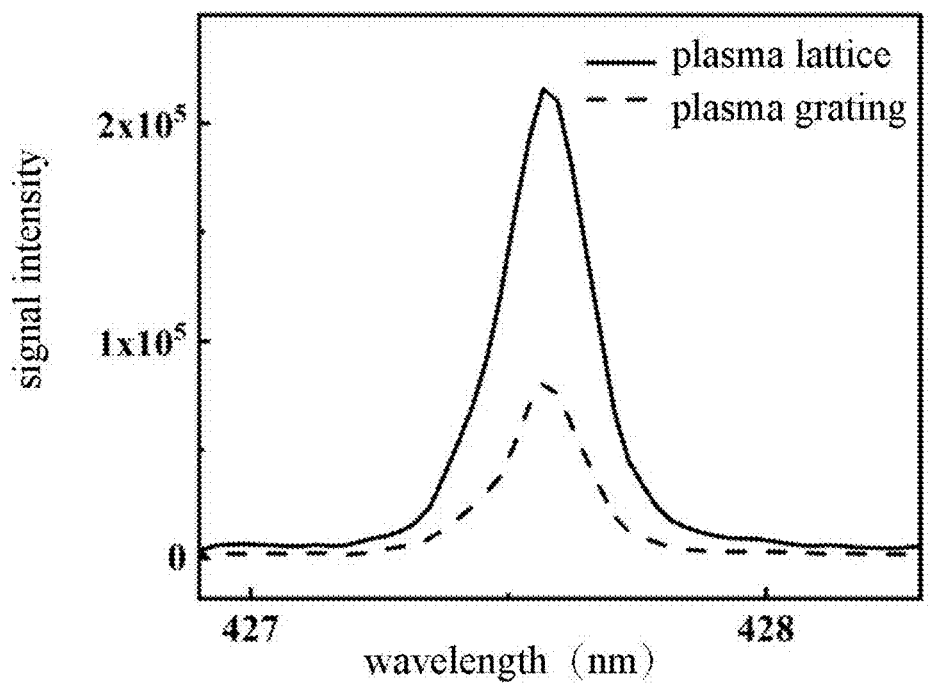
FIG. 6 shows a comparison of spectral line signal intensities between the plasma grating and plasma lattice for the excitation of target materials.

FIG. 5 shows images of a plasma grating and a lattice captured through ICCD. FIG. 5(a) shows an image of the plasma grating, representing as a longitudinal plasma channel. FIG. 5(b) shows an image of the plasma lattice, representing as the plasma channels in the spatial array. Two non collinear femtosecond filaments are crossly coupled with each other to generate a plasma grating; while three non collinear femtosecond filaments crossly coupled to generate a plasma lattice. FIG. 6 shows a comparison of spectral line signal intensities between the plasma grating and plasma lattice, in which the spectral line signal intensity of the plasma lattice is more than twice that of the plasma grating, and thus the application of the plasma lattice for exciting the target material can achieve better excitation effects.

Figure 7:
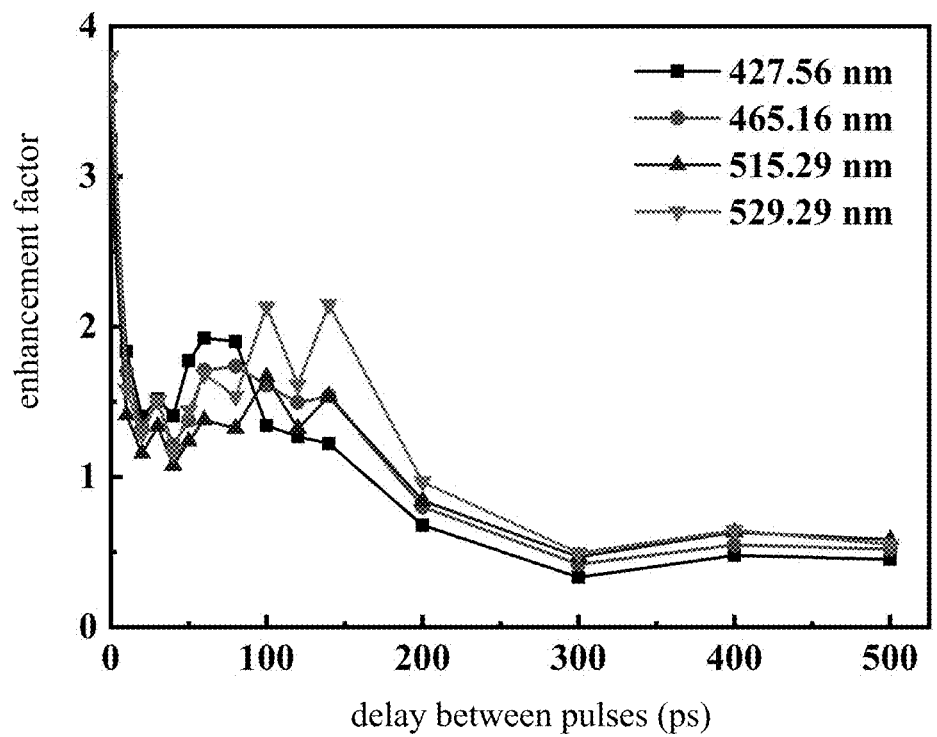
FIG. 7 shows a diagram of an enhancement factor changing with a delay between pulses, where the enhancement factor is a spectral line intensity ratio of the excitation of target material by post pulses and a plasma grating coupled in relative to the excitation of target material by a plasma grating.

FIG. 7 shows a diagram of an enhancement factor changing with a delay between pulses, where the enhancement factor is a spectral line intensity ratio of post pulses and a plasma grating coupled in relative to a plasma grating, during the excitations of the target material respectively. The enhancement factor is detected with the spectrograph and defined as the ratio of the spectral line intensity when the post pulse and the plasma grating are coupled to excite in relative to the spectral line intensity when the plasma grating is utilized to excite. The enhancement factor can effectively reflect the excitation effect on the target material and thus may be used to determine the optimal pulse delay between the post pulse and the plasma grating. When the delay between the post pulse and the plasma grating pulse is 0 ps, the enhancement factor is at maximum, and the spectral line intensity of the coupling for excitation is maximum, and the excitation effect is equivalent to that of the plasma lattice at this time. When the delay between the pulses increases from 0 ps to around 50 ps, the enhancement factor sharply decreases with the increase of delay. When the delay between the pulses increases from 50 ps to 140 ps, the enhancement factor increases along with the increase of delay. When the pulse delay is 60-140 ps, it is the second highest region of the enhancement factor. When the delay between the pulses increases from 140 ps to 500 ps, the enhancement factor continues to decrease. Therefore, when coupling the plasma grating with post pulses for exciting, the delay of the post pulse relative to the plasma grating may be selected within the range of 60-140 ps to achieve an ideal excitation effect.

Figure 8:
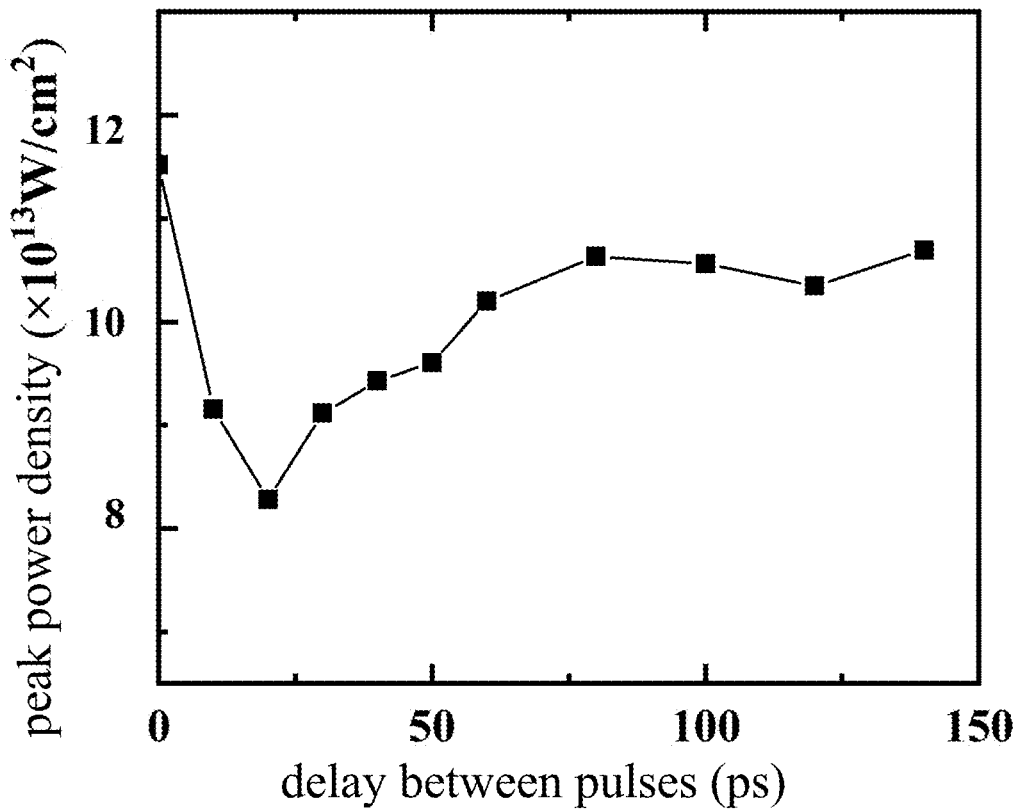
FIG. 8 shows a diagram of a peak power density, of a plasma grating in a plasma grating channel after coupled with post pulses, changing with a delay between pulses.

FIG. 8 is a diagram showing the peak power density of a plasma grating changing with the delay between the pulses, where the plasma grating is coupled with a single femtosecond filament as a post pulse. The measurement method refers to the doctoral dissertation "Research on the Light Intensity Clamping Effect in Femtosecond Laser Filamentation Phenomenon", and the formula refers to the follows.

$$I_0 = 79 \times \left(\frac{2.6}{R} - 1\right)^{0.34} \times 10^{12} \text{ W/cm}^2$$

When the delay between the post pulse and the plasma grating is 0 ps, the peak power density is the highest. When the delay increases from 0 ps to 23 ps, the peak power density sharply decreases and reaches its lowest value when the pulse delay is near 23 ps. When the delay increases from 23 ps to 140 ps, the peak power density continues to increase and reaches the second highest position around 60-140 ps. This can also prove that when the delay between the post pulse and the plasma grating is in the range of 60-140 ps, it is more suitable to excite the target material for coating. Specific delay settings may be further determined by referring to the coating effect.

A basic embodiment of the present disclosure is performed by a device shown in FIG. 9, where femtosecond laser unit 1 generates a femtosecond-pulsed laser with the pulse width of 50 fs, the central wavelength of 800 nm, and the repetition rate of 1 kHz. The femtosecond-pulsed laser passes through shutter 2 and beam splitters 3 and 10, and is split into three beams of pulse A, pulse B and pulse C with equal energy. Pulse C passes through a delay optical path including reflectors 4, 5, 6, 7, 8, 9, beam splitter 3 and stepper motor i and is focused by lens 18 to form femtosecond filaments. Pulse B passes through a delay optical path including reflectors 11, 12, beam splitters 3, 10, and stepper motor iii and is focused by lens 17 to form femtosecond filaments. Pulse A passes through an optical path including reflectors 13-15 and beam splitters 3, 10 and is focused by lens 16 to form femtosecond filaments. Pulse A, pulse B and pulse C enter a deposition chamber and intersect on the surface of the target material. The stepper motor i is adjusted so that the optical paths traveled by pulse A and pulse C are same, and pulse A and pulse C are interacted to form a femtosecond plasma grating, which performs a primary excitation on the target material. Pulse B, with an incidence at a first-order or higher-order Bragg diffraction angle relative to the plasma grating, are coupled with the plasma grating to perform a secondary excitation on the target material. The stepper motor ii is adjusted to arrive at the best coupling effect between pulse B and the plasma grating. The plasma generated from the target material excited by the plasma grating is diffused, cooled, and deposited onto a glass substrate to form a thin film. By moving the target material platform and substrate platform to assist in excitation, large-area coating can be achieved. The specific timing for coating is opening a gas input inlet to allow rare gases to flow in first, then moving the two carriers (platforms) at a uniform velocity, opening the shutter in the optical path to excite the target material by the plasma grating, and performing deposition for coating. After finishing the deposition and coating, the shutter is closed first, then the gas input inlet is closed, and then the movement of the carriers is stopped. In addition, when the coating for specific materials is performed, high-purity reaction gases may also be introduced to react with the target material to form a film.

Another basic embodiment of the present disclosure is performed by a device shown in FIG. 10, where femtosecond laser unit 1 generates a femtosecond-pulsed laser with the pulse width of 50 fs, the central wavelength of 800 nm, and the repetition rate of 1 kHz. The femtosecond-pulsed laser passes through shutter 2 and beam splitters 3, 7 and 10, and is split into four femtosecond pulses with the equal energy, namely pulse A, pulse B, pulse C, and pulse D. Pulse D passes through a delay optical path including reflectors 4, 5, 6, 16, 17, 18, 19 and 20, beam splitters 3 and 7, and stepper motors i and iii and is focused by lens 22 to form femtosecond filaments. Pulse C passes through a delay optical path including reflectors 4, 5, 6, 8 and 9, beam splitters 3 and 7, and stepper motor i and is focused by lens 24 to form femtosecond filaments. Pulse B passes through a delay optical path including reflectors 11, 12, beam splitters 3 and 10, and stepper motor ii and is focused by lens 23 to form femtosecond filaments. Pulse A passes through an optical path including reflectors 13-15 and beam splitters 3 and 10 and is focused by lens 21 to form femtosecond filaments. Pulse A, pulse B, pulse C, and pulse D enter a deposition chamber and intersect on the surface of the target material. The stepper motors i and ii are adjusted so that the optical paths traveled by pulses A, B, and C are same, to crossly couple to form a femtosecond plasma lattice, which performs a primary excitation on the target material. Pulse D with an incidence at a first-order or higher-order Bragg diffraction angle relative to the plasma lattice and are coupled with the plasma lattice to perform a secondary excitation on the target material. The stepper motor iii is adjusted to arrive at the best coupling effect between pulse D and the plasma lattice. The plasma generated from the target material excited the plasma lattice is diffused, cooled, and deposited onto the glass substrate to form a thin film. By moving the target material platform and substrate platform to assist in excitation, large-area coating can be achieved. The specific timing for coating is opening a gas input inlet to allow rare gases to flow in first, then moving the two carriers (platforms) at a uniform velocity, opening the shutter in the optical path, to excite the target material by the plasma lattice, and performing deposition for coating. After finishing the deposition and coating, the shutter is closed first, then the gas input inlet is closed, and then the movement of the carriers is stopped. In addition, when the coating for specific materials is performed, high-purity reaction gases may also be introduced to react with the target material to form a film.

Example 1

In the present Example, SiC was used as the target material and quartz glass was used as the substrate, and the distance between the target material and the glass substrate was 4 mm. The pulse energy output by the laser unit was 2 mJ. After splitting, the energy of pulse A and pulse C was 0.7 mJ, and the energy of pulse B was 0.6 mJ. Pulse A and pulse C were crossly coupled to form a plasma grating, with an angle of 14° between pulse A and pulse C. Pulse B was incident to the plasma grating at a first-order Bragg angle, with an angle of 7° between pulse B and the plasma grating. The delay between pulse B and the plasma grating was 60 ps. Before the target material was excited by the plasma grating, argon gas was introduced into the deposition chamber to isolate air with a gas flow rate of 10 L/min. The movement speed of the two moveable platforms (carriers) was set for 30 mm/s, corresponding spacing between each pulse excitation point was 30 μm. After the platforms started moving, the shutter was opened for excitation. After the excitation was completed, the shutter was closed, the gas inlet was closed, the movement of the platform was stopped, and the system remained static for 15 minutes to complete the deposition of SiC film layer on the substrate.

Example 2

In the present Example, SiN was used as the target material and quartz glass was used as the substrate, and the distance between the target material and the glass substrate was 2 mm. The energy of single pulse output by the laser unit was 5 mJ, and all of the energy of pulse A, pulse B, pulse C, pulse D and pulse E was 1 mJ. Pulse A, pulse B, and pulse C were crossly coupled to form a plasma lattice. The angle between pulse A and pulse C was 10°, and the angle between pulse B and pulse C was 10°. Pulse D and pulse E were incident on the surface of the plasma lattice at a first order Bragg angle of 7° and a second order Bragg angle of 14° relative to the plasma lattice individually. The delays between pulse D and pulse E with the plasma lattice were 60 ps and 120 ps, respectively. Before the target material was excited by the plasma lattice, argon gas, as a reaction gas, was introduced into the deposition chamber to isolate air with a gas flow rate of 2 L/min. The movement speed of the two moveable platforms (carriers) was set for 30 mm/s, corresponding spacing between each pulse excitation point was 30 μm. After the platforms started moving, the shutter was opened for excitation. After the excitation was completed, the shutter was closed, the gas inlet was closed, the movement of the platform was stopped, and system remained static for 15 minutes to complete the deposition of SiN film layer on the substrate.

The above is only embodiments of the present disclosure, and general knowledge such as the specific technical solutions and/or characteristics commonly known in the solution are not described in detail herein. It should be noted that for those skilled in the art, various modifications and improvements can be made without departing from the technical solution of the present disclosure, which should also be considered as the scope of protection of the present disclosure, and will not affect the effectiveness of the embodiments of the present disclosure and the practicality of the patent. The scope of protection of this application is limited by the appended claims, and the detailed description and other records in the specification can be used to explain the content of the claims.

What is claimed is:

1. A method of an ultrafast-pulsed laser deposition, comprising:
   step 1: after splitting a femtosecond-pulsed laser beam, focalizing split femtosecond-pulsed laser beams to form a plasma channel based on a nonlinear effect and to generate a femtosecond laser filament; synchronizing the femtosecond-pulsed laser beam by delay synchronization processing so as to form a plasma grating or a plasma lattice by the femtosecond laser filament coupled with each other non-collinearly and crossly; and exciting a target material with the plasma grating or the plasma lattice;
   step 2: emitting multiple ultrafast-pulsed laser beams as post pulses; coupling the post pulses with the plasma grating or the plasma lattice sequentially, by controlling a first delay between the post pulses and the plasma grating or the plasma lattice and a second delay between the post pulses thereof, so as to form a regenerated plasma grating or a regenerated plasma lattice with multi-stage cascade in a time domain; and exciting the target material for multiple times; and
   step 3: exciting and ablating the target material by adjusting the ultrafast-pulsed laser beams coupled with the regenerated plasma grating or the regenerated plasma lattice, to form a thin film with a required thickness by a deposition of ablated particles on a substrate, by controlling the time.

2. The method according to claim 1, wherein in the step 1, each of the split femtosecond-pulsed laser beams possesses energy greater than 0.5 mJ, a repetition frequency of 1 Hz-1 MHz, a center wavelength of 200-2,500 nm, and a pulse width of 5-1,000 fs.

3. The method according to claim 2, wherein in the step 1, the split femtosecond-pulsed laser beams possess an angle of 5 to 21° therebetween.

4. The method according to claim 1, wherein in the step 2, the multiple ultrafast-pulsed laser beams comprise at least one of a femtosecond-pulsed laser, a picosecond-pulsed laser, or a nanosecond-pulsed laser.

5. The method according to claim 4, wherein in the step 2, the first delay between the post pulses and the plasma grating or the plasma lattice is 10 ps to 1 ns.

6. The method according to claim 5, wherein in the step 2, an incident angle between the post pulses and the plasma grating or the plasma lattice is 7 to 21°.

7. The method according to claim 1, wherein in the step 3, the deposition is performed in a deposition chamber set with a rare gas environment, wherein the rare gas is at least one of helium and argon.

8. The method according to claim 1, wherein in the step 1, two or three split femtosecond-pulsed laser beams are formed, when crossly coupled, two femtosecond laser filaments are non-collinearly and crossly coupled to form the plasma grating, and three femtosecond laser filaments are noncoplanarly and crossly coupled to form the plasma lattice.

\* \* \* \* \*